Patented July 11, 1939

2,165,729

UNITED STATES PATENT OFFICE 2,165,729

MANUFACTURE OF IGNITED PHOSPHATES

Friedrich Rüsberg, Berlin - Niederschoneweide, Germany, assignor to Kali-Chemie Aktiengesellschaft, Berlin, Germany No Drawing. Application February 1, 1937, Serial No. 123,521. In Germany February 10, 1936

3 Claims. (Cl. 71—45)

The present invention relates to the manufacture of ignited or calcined phosphates by heating crude phosphates or phosphate rock in mixture with converting agents or constituents such as silicic acid, lime and the like and alkali compounds.

It is an object of my invention to treat the crude phosphates for the purpose of producing soluble phosphates, in a shorter period of time and to convert them more completely than it has been possible with the hitherto known processes.

Another object of my invention is to reduce the loss or dissipation of potassium compounds in igniting or burning the crude phosphates.

Hitherto, in the production of ignited phosphates, the carbonates, sulphates or chlorides of the alkali or mixtures thereof have been proposed as alkaline additions, besides other constituents such as lime or silicic acid.

Practically, the alkaline carbonates have been used chiefly, while the sulphates are less in use and the chlorides are not known to be employed. This obviously is due to the fact that the process is easier and simpler carried out with the aid of carbonates. When carrying out the igniting process commercially, it is necessary, for economic reasons, to effect the heating directly by the furnace gases. If alkali carbonates are used for the converting, the gases leaving the furnace besides nitrogen contain only carbon dioxide and small percentages of incombustible constituents so that these gases can be allowed to escape into the atmosphere. On the other hand, if using sulphates or chlorides, the gases leaving the furnace apart from carbon dioxide and nitrogen contain sulphurous acid or hydrochloric acid. The acid components of these gases have to be extracted or removed before the gases can be permitted to escape into the atmosphere. This, of course, involves considerable expenses and technical difficulties, because these substances which are to be removed are contained in relatively small percentages or concentration only.

Now, I have found that the process can be materially improved if organic alkali compounds, such as for instance acid or neutral alkali metal salts of organic acids are used instead of alkali carbonates. If the other conditions remain unchanged, the conversion or reaction in case of organic alkali compounds requires less time and is effected more completely than in case of inorganic alkali compounds. Moreover, when burning the organic alkali compounds, a considerable amount of heat is produced which can be utilized for promoting the converting process.

If ignited phosphates containing potassium are to be produced, the use of organic potassium compounds offers additional advantages over potassium carbonate. To a certain extent, the potassium compounds are volatile at the converting or reaction temperature. Now, the loss or dissipation of potassium is the smaller the more the conversion or reaction is facilitated or accelerated; therefore, it is more advantageous, also from this aspect, to use the organic potassium compounds, which react more readily than the carbonates.

From the organic alkaline compounds the readily available or accessible organic compounds, such as for example potassium formate or sodium formate are particularly suitable for commercial production, but other organic compounds, such as for instance oxalates, tartrates, acetates and the like may also be used instead of, or in addition to, the first mentioned substances.

For the sake of a more complete understanding I describe hereinafter my new process by way of a practical example.

1000 kilograms of crude phosphate containing 38% of $P_2O_5$ have been intimately mixed with 102 kgs. of sand and 496 kgs. of potassium formate and burnt at 1000° C. in a rotary furnace or kiln. A soft porous clinker was obtained which after the grinding process analyzed as follows:

| | Per cent |
|---|---|
| Total $P_2O_5$ | 29.0 |
| $P_2O_5$ soluble in citric acid | 28.2 |
| Citrate-soluble $P_2O_5$ | 26.4 |
| $K_2O$ | 21.3 |

By way of comparison, 1000 kgs. of the same phosphate have been mixed with 102 kgs. of sand and 407 kgs. of potash and the mixture was burnt in the same rotary tube furnace, i. e., under the same conditions, at about 1040 to 1060° C. The clinker in this case after the grinding had the following composition:

| | Per cent |
|---|---|
| Total $P_2O_5$ | 29.6 |
| $P_2O_5$ soluble in citric acid | 22.6 |
| Citrate-soluble $P_2O_5$ | 20.1 |
| $K_2O$ | 19.4 |

It will be apparent from the above comparative examples that the potassium formate proved to be much more reactive than potash, because, after the same period of time which was sufficient to convert the potassium formate completely, the conversion was not yet finished in case of using potash although the temperature even was somewhat higher; moreover the potassium losses were higher in the second example.

It will be understood that the organic alkali compounds which are used according to my invention, may also be employed combined with or in addition to inorganic alkaline compounds such as for instance carbonates. Moreover, other suitable admixtures may also be added to the crude phosphate such as for instance carbon.

So, while I have herein shown and described certain preferred embodiments of my invention, I wish it to be understood that I do not confine myself to all the precise details herein set forth by way of illustration, as modification and variation may be made without departing from the spirit of the invention or exceeding the scope of the appended claims.

I claim:

1. The process for the manufacture of ignited phosphate comprising calcining crude phosphate to sintering temperature in the presence of an alkali metal formate in amount sufficient to produce at least 90% of the resultant $P_2O_5$ in citrate-soluble form and until such conversion is effected.

2. The process for the manufacture of ignited phosphate comprising heating crude phosphate to a temperature of about 1000° C. in the presence of an alkali metal formate in amount sufficient to produce at least 90% of the resultant $P_2O_5$ in citrate-soluble form and until such conversion is effected.

3. The process for the manufacture of ignited phosphate comprising calcining crude phosphate containing 38% of $P_2O_5$ in the presence of potassium formate and silica, the proportion phosphate : formate : silica being substantially 10:5:1 by weight.

FRIEDRICH RÜSBERG.